United States Patent
Bugenhagen et al.

(10) Patent No.: US 7,522,607 B2
(45) Date of Patent: Apr. 21, 2009

(54) CONGESTION HANDLING IN A PACKET COMMUNICATION SYSTEM

(75) Inventors: Michael K. Bugenhagen, Olathe, KS (US); Jack E. Brown, Leawood, KS (US); Robert B. Dianda, Leawood, KS (US)

(73) Assignee: Sprint Communications Company LP, Overland Park, KS (US)

( * ) Notice: Subject to any disclaimer, the term of this patent is extended or adjusted under 35 U.S.C. 154(b) by 809 days.

(21) Appl. No.: 10/764,910

(22) Filed: Jan. 26, 2004

(65) Prior Publication Data

US 2005/0163126 A1    Jul. 28, 2005

(51) Int. Cl.
- H04L 12/28 (2006.01)
- H04J 3/14 (2006.01)
- G08C 15/00 (2006.01)
- G06F 15/16 (2006.01)
- G01R 31/08 (2006.01)

(52) U.S. Cl. ................ 370/395; 370/232; 370/352; 709/246

(58) Field of Classification Search ......... 370/229–241, 370/352–468; 709/224–227, 203–223; 455/437–450
See application file for complete search history.

(56) References Cited

U.S. PATENT DOCUMENTS

| | | | | |
|---|---|---|---|---|
| 5,574,977 | A * | 11/1996 | Joseph et al. | 455/450 |
| 6,018,515 | A * | 1/2000 | Sorber | 370/229 |
| 6,233,447 | B1 * | 5/2001 | Tomoike | 455/411 |
| 6,363,052 | B1 * | 3/2002 | Hosein | 370/230 |
| 6,614,781 | B1 * | 9/2003 | Elliott et al. | 370/352 |
| 6,643,256 | B1 * | 11/2003 | Shimojo et al. | 370/229 |
| 6,643,258 | B1 | 11/2003 | Ise et al. | |
| 6,650,619 | B1 * | 11/2003 | Schuster et al. | 370/230 |
| 6,741,694 | B1 * | 5/2004 | Smith et al. | 379/221.08 |
| 6,882,653 | B1 * | 4/2005 | Kiuchi et al. | 370/401 |
| 6,937,597 | B1 * | 8/2005 | Rosenberg et al. | 370/356 |
| 6,977,933 | B2 * | 12/2005 | Soncodi et al. | 370/392 |
| 6,977,994 | B2 * | 12/2005 | Stephenson et al. | 379/93.01 |
| 6,980,517 | B1 * | 12/2005 | Qureshi et al. | 370/235 |
| 6,985,740 | B2 * | 1/2006 | Shyy et al. | 455/453 |
| 7,050,447 | B2 * | 5/2006 | Silverman et al. | 370/412 |
| 7,106,722 | B1 * | 9/2006 | Kuster et al. | 370/352 |
| 7,254,643 | B1 * | 8/2007 | Peters et al. | 709/246 |

(Continued)

OTHER PUBLICATIONS

Willis, D., "Session Initiation Protocol Extension to Assure Congestion Safety draft-ietf-sip-congestsafe-01" IETF Standard-Working-Draft, Internet Engineering Task Force, IETF, CH, vol. sip, No. 1, Feb. 12, 2003.

Primary Examiner—Man Phan (57) ABSTRACT

A packet communication system is disclosed that includes an end communication device, a call processing system, and a packet network. To setup up a call from an end user, the end communication device transmits a call request message to the call processing system. The call request message has a header that includes priority information for the call. The call processing system processes the priority information in the header of the call request message to determine if the call request message is for a high priority call. If the call request message is not for a high priority call and the call processing system is in a state of congestion, then the call processing system transmits a response message indicating the state of congestion. Responsive to receiving the response message, the end communication device performs call blocking and provides call treatment to the end user.

26 Claims, 9 Drawing Sheets

U.S. PATENT DOCUMENTS

| | | | |
|---|---|---|---|
| 7,372,810 B2 * | 5/2008 | Punjabi | 370/230 |
| 2003/0219011 A1 * | 11/2003 | Han | 370/352 |
| 2004/0087311 A1 * | 5/2004 | Haglund | 455/453 |
| 2004/0151166 A1 * | 8/2004 | Tsukagoshi et al. | 370/352 |
| 2004/0240389 A1 * | 12/2004 | Bessis et al. | 370/252 |
| 2005/0070230 A1 * | 3/2005 | Das et al. | 455/69 |
| 2005/0088973 A1 * | 4/2005 | Ibezim et al. | 370/235 |
| 2005/0117556 A1 * | 6/2005 | Lee et al. | 370/338 |
| 2005/0157646 A1 * | 7/2005 | Addagatla et al. | 370/232 |
| 2006/0251050 A1 * | 11/2006 | Karlsson | 370/352 |
| 2007/0133400 A1 * | 6/2007 | Hirade | 370/229 |

* cited by examiner

CONGESTION HANDLING IN A PACKET COMMUNICATION SYSTEM

BACKGROUND OF THE INVENTION

1. Field of the Invention

The invention is related to the field of communication systems, and in particular, to congestion handling in a packet communication system.

2. Statement of the Problem

Telephone networks may become congested for a variety of reasons. One reason for congestion in the telephone network may be problems with a switch in the network or with one or more resources in a switch. Another reason for congestion in the telephone network may be a mass calling event, such as ticket sales for a concert, a radio call-in promotion, a natural disaster, etc. During a mass calling event, there may be thousands of calls going through a particular switch of the telephone network. Switches have a limited capacity and the high volume of calls during the mass calling event can overwhelm the switch.

Traditional telephone networks are able to handle congestion by having the switches in the network communicate with each other. Assume that an originating switch transmits an SS7 call setup message for a call to a destination switch. Further assume that the destination switch is experiencing congestion and cannot properly handle the call. Responsive to receiving the call setup message, the destination switch processes a priority bit of the call setup message to determine if the call is a high priority call. If the call is a high priority call, then the destination switch attempts to connect the call. If the call is not a high priority call, then the destination switch may discard the call attempt if it has already sent an SS7 congestion message or may transmit an SS7 congestion message to the originating switch. Responsive to the congestion message, the originating switch performs call blocking on calls headed for the destination switch. The originating switch also provides call treatment for the blocked calls, such as playing tones or a message.

In a traditional telephone network such as this, the originating switch and the terminating switch are not considered end devices or end-user devices. The switches are owned and/or controlled by the telephone company, and not the end user, such as a customer of the telephone company. The end user may own a phone or computer, which may be considered an end device. However, because the switches are not end devices, the call blocking does not take place in an end device. Plus, end devices in the telephone network do not receive SS7 signaling, and consequently do not receive the congestion message from a congested switch.

To provide higher bandwidths and enhanced features, packet networks have been implemented for voice and data communications. Assume that a caller wants to place a voice call over a packet network using a Session Initiation Protocol (SIP) phone. To set up the call, the SIP phone sends an invite message to a gateway controller. Responsive to the invite message, the gateway controller responds to the SIP phone, such as with a network address of the destination of the call.

Problems occur in packet networks when the gateway controller is in a state of congestion. If the gateway controller is in a state of congestion, then invite messages transmitted to the gateway controller may be ignored, dumped, or discarded. If the SIP phone does not receive a response from the gateway controller after a period of time, then the SIP phone re-transmits the invite message to the gateway controller. This re-transmission of invite messages exacerbates the congestion problem in the gateway controller.

Further, when the invite messages are ignored, the SIP phone may sit quietly and not provide any call treatment to the end user of the SIP phone. The end user may not know the status of the call.

Problems further arise when the SIP phone is trying to place an emergency call, such as a 911 call. If the SIP phone transmits an invite message for an emergency call and the gateway controller is congested, then the gateway controller is not able to respond to the invite message from the SIP phone, even though the invite message is for an emergency call. Unfortunately, the invite messages currently are not marked as emergency or high priority messages. Because the invite messages are not marked, the gateway controller is not able to prioritize messages. The only way the gateway controller is able to determine that the invite message from the SIP phone is for an emergency call is to actually process the invite message. The gateway controller may have to process the invite message down to the dialed digits to identify the emergency status of the call. Processing the invite message uses up valuable resources in the gateway controller. When the gateway controller is already congested, it is unlikely that the gateway controller will be able to process the invite message. Unfortunately, invite messages for emergency calls may be ignored in current packet networks when a gateway controller is in a state of congestion.

One current way to handle congestion in a packet network is to reduce the workload of a signaling system, such as a gateway controller, which is referred to as load shedding. An example of a method for load shedding is illustrated in U.S. Pat. No. 6,650,619. Although load shedding may help temporarily reduce the workload of a gateway controller, the load shedding may not be enough to effectively handle congestion in a packet network.

SUMMARY OF THE SOLUTION

The invention helps solve the above problems by implementing congestion handling and priority handling in a packet communication system. The packet communication system includes an end communication device that communicates with a call processing system over a packet network. Assume that an end user wants to make a call using the end communication device. To setup up the call, the end communication device transmits a call request message to the call processing system. The call request message has a header that includes priority information for the call. The priority information may indicate that the call is an emergency call (a 911 call), a Government Emergency Telephone Service (GETS) call, etc. Also, assume that the call processing system is in a state of congestion. The call processing system receives the call request message and processes the priority information in the header of the call request message to determine if the call request message is for a high priority call. If the call request message is for a high priority call, then the call processing system may attempt to set up the call. If the call request message is not for a high priority call, then the call processing system transmits a response message indicating the state of congestion in the call processing system. Responsive to receiving the response message, the end communication device performs call blocking for calls to be handled by the call processing system. The end communication device also provides call treatment to the end user so that the end user is aware of the status of the call.

Advantageously, the packet communication system is able to proactively handle congestion in the call processing system. By providing the end communication device with a response message indicating the state of congestion of the call processing system, the end communication device avoids sending multiple call request messages (such as invite messages) to the call processing system, which lowers the processing burden on the call processing system. The end communication device can also keep the end user informed as to the status of the call, instead of the end user being left high and dry by a discarded call request message.

Another important feature of the packet communication system is that calls can be prioritized without having to be actually processed by the call processing system. By placing the priority information in the header of the call request message, the call processing system may quickly look to the header of the received messages to filter out the high priority calls. When in a state of congestion, the call processing system can identify the high priority calls with little processing time and can attempt to setup up the high priority calls. At the same time, the end communication devices are blocking some or all of the lower priority calls.

The invention may include other embodiments described below.

DESCRIPTION OF THE DRAWINGS

The same reference number represents the same element on all drawings.

DETAILED DESCRIPTION OF THE INVENTION

Figure 1A:
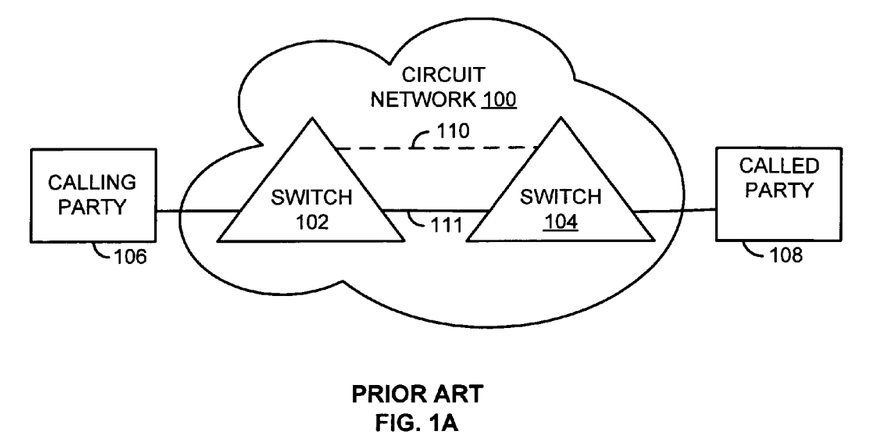
FIG. 1A depicts a circuit network in the prior art.
Figure 1B:
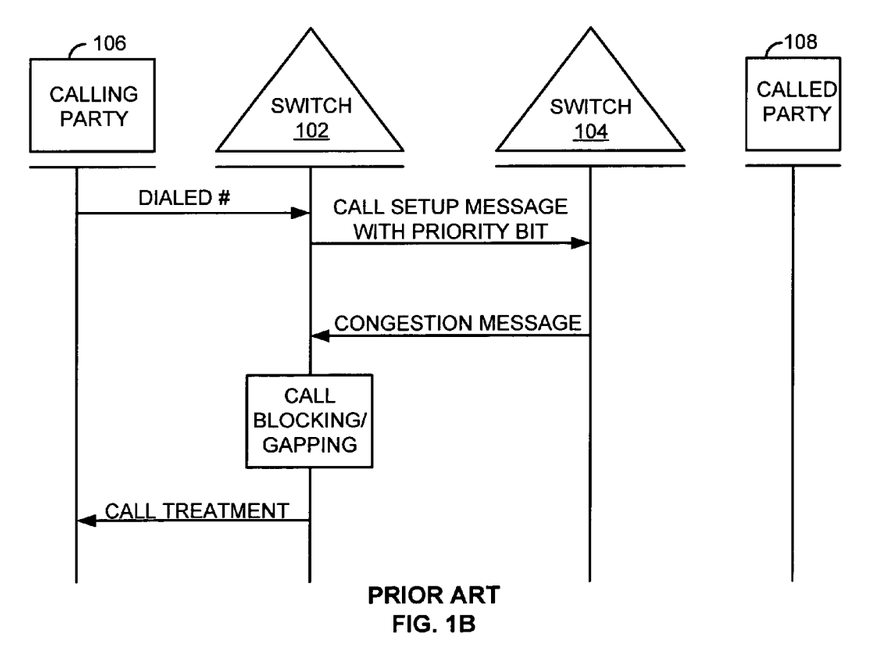
FIG. 1B is a signaling diagram illustrating call setup in the circuit network of FIG. 1A in the prior art.

Prior Art Circuit Network—FIGS. 1A-1B

FIG. 1A depicts a circuit network 100 in the prior art to help in better understanding the invention. Circuit network 100 includes an originating switch 102 connected to a terminating switch 104. A calling party 106 connects to originating switch 102. A called party 108 connects to terminating switch 104. Originating switch 102 and terminating switch 104 each comprise tandem switches. There may be other switches connected in circuit network 100 that are not shown for the sake of brevity.

Switches 102 and 104 communicate via signaling connections 110 and bearer connections 111. The bearer connections 111 transport user communications, such as voice or data for a call, and are shown as solid lines. The signaling connections 110 transport call signaling, such as Initial Address Messages (IAM), Address Complete Messages (ACM), or other SS7 signaling messages, and are shown as dotted lines.

Switches 102 and 104 are components owned and maintained by a local phone company, a long-distance phone company, or another carrier. Calling party 106 is able to access switch 102 for a fee, but calling party 106 does not control switch 102. The SS7 signaling is between switches 102 and 104 and does not extend out to calling party 106 and called party 108.

FIG. 1B is a signaling diagram illustrating call setup in circuit network 100 in the prior art. The messages in the signaling diagram illustrate signaling messages for setting up a call, such as SS7 messages. To start, calling party 106 transmits a dialed number for the call to switch 102. Switch 102 processes the dialed number and generates a call setup message, such as an IAM. In this example, switch 102 determines that the call needs to be forwarded through switch 104 to get to called party 108. Thus, switch 102 transmits the call setup message to switch 104.

The call setup message transmitted to switch 104 includes a priority bit. The priority bit indicates whether the call is a 911 call or other emergency call, a GETS call, etc.

Further assume for this example that switch 104 is experiencing congestion. Responsive to receiving the call setup message, switch 104 processes the priority bit of the call setup message to determine if the call is a high priority call. If the call is a high priority call, then switch 104 attempts to connect the call (not shown). If the call is not a high priority call, then switch 104 transmits a congestion message to switch 102. Responsive to the congestion message, switch 102 performs call blocking or call gapping on calls headed for switch 104. Switch 102 also provides call treatment for the block calls, such as playing tones or a message to calling party 106.

Although circuit network 100 is able to proactively handle congestion in switches through call blocking or call gapping, a packet communication system may be used for certain voice and data applications instead of circuit network 100 because of the extra bandwidth provided by the packet communication system.

Figure 2A:
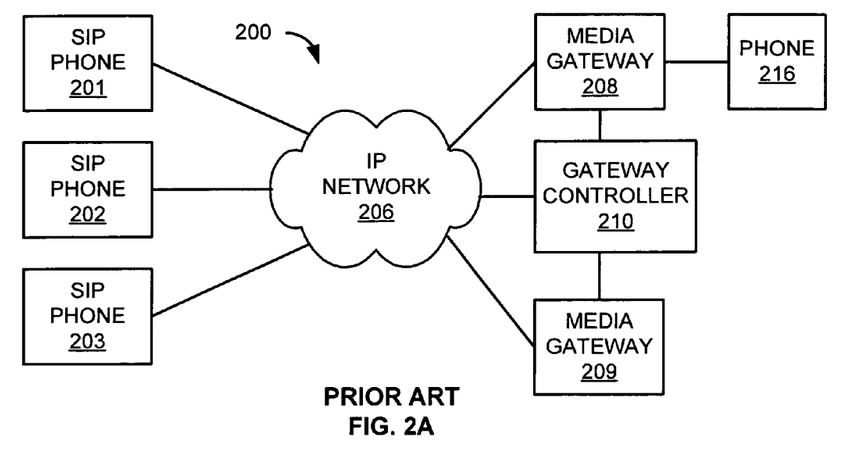
FIG. 2A illustrates a packet network in the prior art.
Figure 2B:
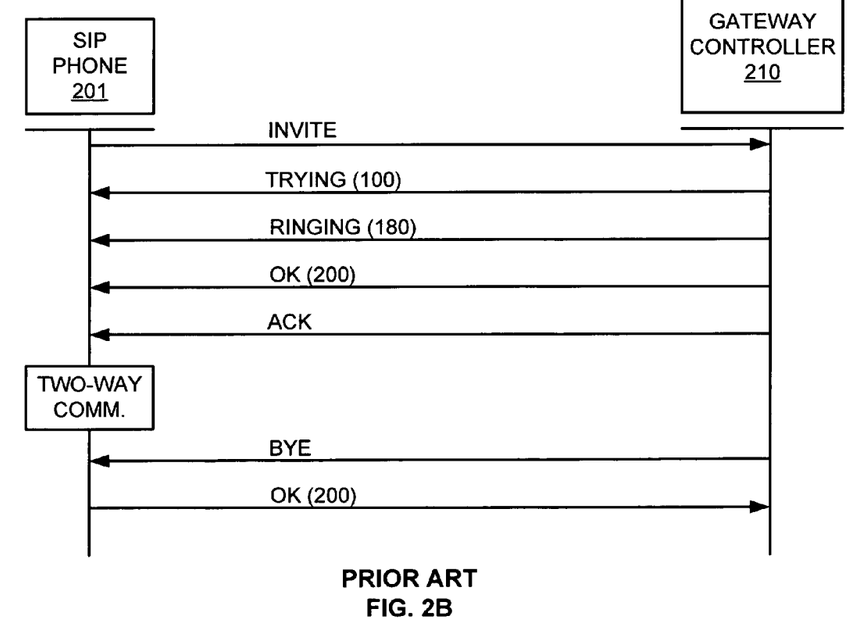
FIG. 2B is a signaling diagram illustrating call setup in the packet network of FIG. 2A in the prior art.
Figure 2C:
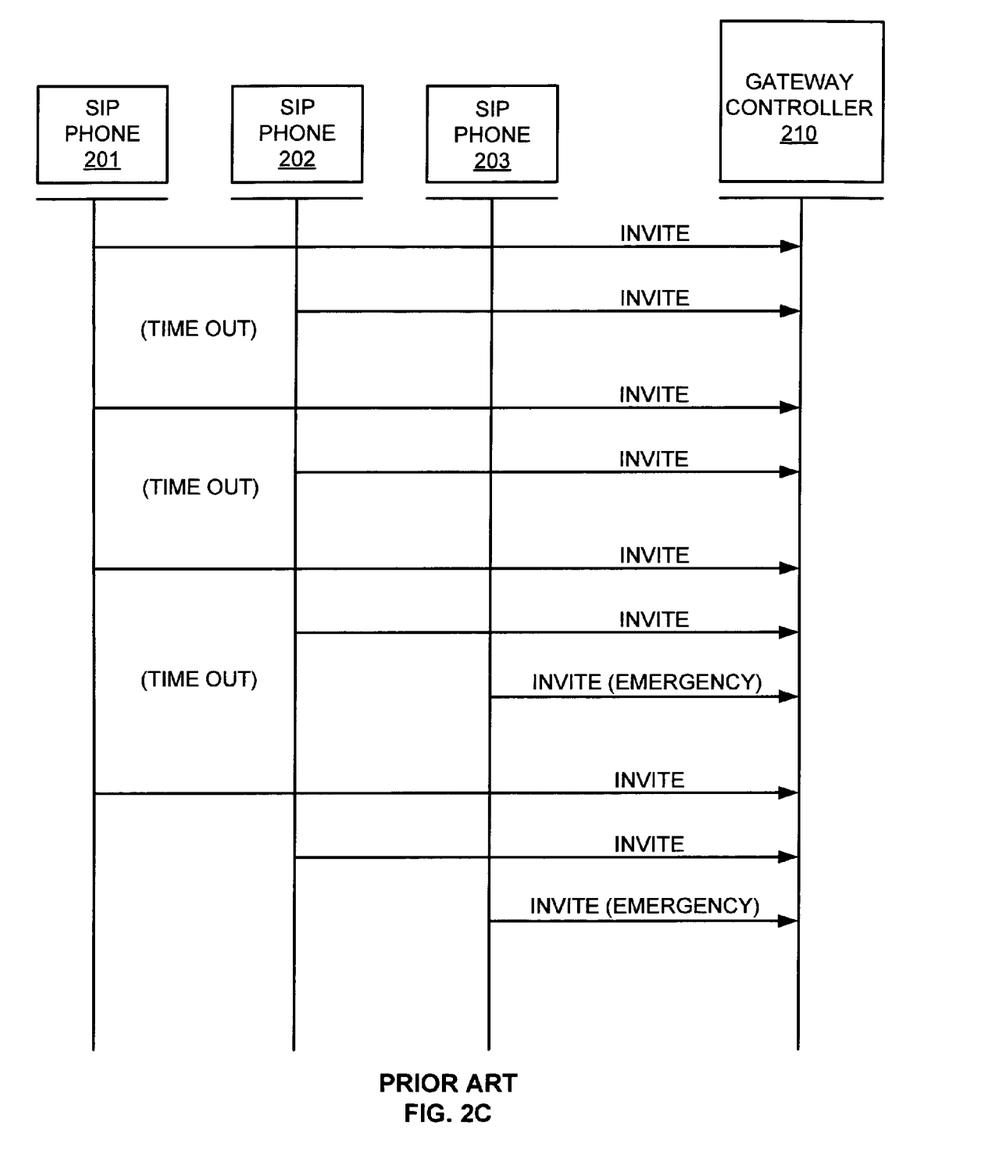
FIG. 2C is a signaling diagram illustrating call setup in the packet network of FIG. 2A when a gateway controller is in a state of congestion in the prior art.

Prior Art Packet Communication System—FIGS. 2A-2C

FIG. 2A illustrates a packet communication system 200 in the prior art to help in better understanding the invention. Packet communication system 200 includes Session Initiation Protocol (SIP) phones 201-203, Internet Protocol (IP) network 206, media gateways 208-209, gateway controller 210, and phone 216. Each of SIP phones 201-203 is connected to IP network 206. Media gateways 208-209 and gateway controller 210 are also connected to IP network 206. Gateway controller 210 is connected to media gateways 208-209. Phone 216 is connected to media gateway 208.

Assume that SIP phone 201 places a Voice over Internet Protocol (VoIP) call to phone 216. SIP phone 201 needs to communicate with gateway controller 210 to determine where to route packets for the VoIP call. FIG. 2B is a signaling diagram illustrating call setup in packet communication system 200 in the prior art. To start, SIP phone 201 transmits an invite message to gateway controller 210. Responsive to the invite message, gateway controller 210 transmits a trying message to SIP phone 201. The trying message includes a status code (100) in the header of the message. In SIP, the status code comprises a three digit number that indicates a different status or a different type of message. For example, in SIP, a 1xx code is for information messages, a 2xx code is for success messages, a 3xx code is for re-direction messages, a 4xx code is for client error messages, a 5xx code is for server error messages, and a 6xx code is for global failure messages.

Gateway controller 210 then transmits a ringing message to SIP phone 201. The ringing message also includes a status code (180) in the header of the message. Gateway controller 210 transmits the ringing message when it is trying to ring phone 216. If gateway controller 210 is able to connect with phone 216, then gateway controller 210 transmits an OK message to SIP phone 201. The OK message includes a status code (200) in the header of the message. Responsive to the OK message, SIP phone 201 transmits an ACK message to gateway controller 210. SIP phone 201 may then communicate with phone 216.

If gateway controller 210 determines that phone 216 has terminated the call, then gateway controller 210 transmits a BYE message to SIP phone 201. Responsive to the BYE message, SIP phone 201 transmits an OK message (200) to gateway controller 210. The call is then terminated.

Problems may arise when gateway controller 210 becomes congested. Gateway controllers 210 are able to operate at a certain capacity or serve so many requests. For instance, under normal conditions, a gateway controller 210 may be able to handle ten calls per hundred users per second. The limit on the capacity of gateway controller 210 may be due to processors in gateway controller 210, protocol stacks or queues in gateway controller 210, or other reasons. During a mass calling event, the number of calls may well exceed the capacity of gateway controller 210 and put gateway controller 210 in a state of congestion.

Gateway controller 210 may also become congested if one or more resources in gateway controller 210 fails or is experiencing a problem. For instance, if a processor or memory component fails in gateway controller 210, then the capacity of gateway controller 210 may decrease and may put gateway controller 210 in a state of congestion.

If gateway controller 210 becomes congested, then messages transmitted to gateway controller 210 may be ignored, dumped, or discarded. FIG. 2C is a signaling diagram illustrating call setup in packet communication system 200 when gateway controller 210 is congested in the prior art. Assume to start that SIP phone 201 and SIP phone 202 are attempting to place calls. SIP phone 201 transmits an invite message to gateway controller 210 and SIP phone 202 transmits an invite message to gateway controller 210. Because gateway controller 210 is in a state of congestion, gateway controller 210 is not able to respond to the invite messages from SIP phones 201-202. The invite messages are ignored. When the invite messages are ignored, SIP phones 201-202 may sit quietly and not provide any call treatment to the end user. The end user may not know the status of the call.

After each SIP phone 201-202 times out, each SIP phone 201-202 re-transmits an invite message to gateway controller 210. Because gateway controller 210 is in a state of congestion, gateway controller 210 is not able to respond to the invite messages from SIP phones 201-202 and the invite messages are ignored. Again after each SIP phone 201-202 times out, each SIP phone 201-202 re-transmits an invite message to gateway controller 210. This re-transmission of invite messages exacerbates the congestion problem in gateway controller 210.

Now further assume that SIP phone 203 is trying to place an emergency call, such as a 911 call. SIP phone 203 transmits an invite message to gateway controller 210. Because gateway controller 210 is in a state of congestion, gateway controller 210 is not able to respond to the invite message from SIP phone 203, even though the invite message is for an emergency call. Unfortunately, the invite messages currently are not marked as emergency or high-priority messages. Because the invite messages are not marked, gateway controller 210 is not able to prioritize messages. The only way gateway controller 210 would be able to determine that the invite message from SIP phone 203 is for an emergency is to actually process the invite message. Gateway controller 210 may have to process the invite message down to the dialed digits to identify the emergency status of the call. Processing the invite message uses up valuable resources in gateway controller 210. When gateway controller 210 is already congested, it is unlikely that gateway controller 210 will be able to process the invite message. Unfortunately, invite messages for emergency calls may be ignored when gateway controller 210 become congested.

Again after each SIP phone 201-203 times out, each SIP phone 201-203 re-transmits an invite message to gateway controller 210. This process continues until SIP phones 201-203 stop transmitting invite messages, or gateway controller 210 is no longer congested and can handle the invite messages.

As illustrated above, current packet communication systems do not effectively handle congestion in gateway controllers. Invite messages for calls may be ignored by a congested gateway controller. This can especially be a problem when invite messages for emergency calls or other high priority calls are transmitted to a congested gateway controller.

Figure 3A:
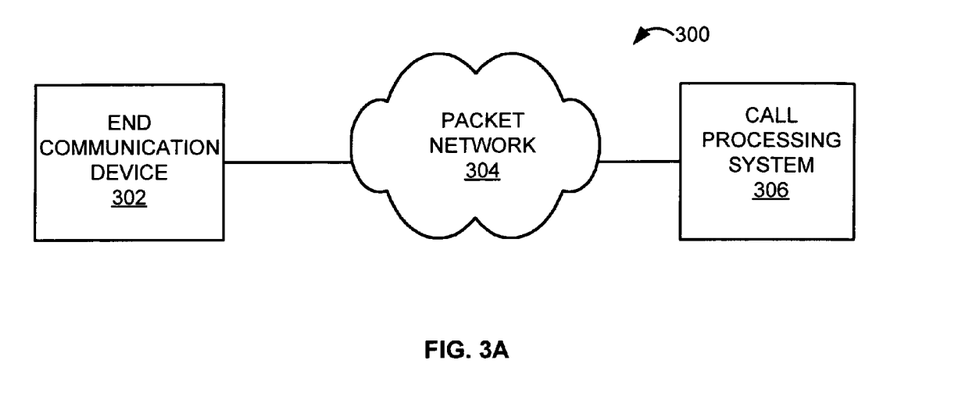
FIG. 3A illustrates a packet communication system in an example of the invention.
Figure 3B:
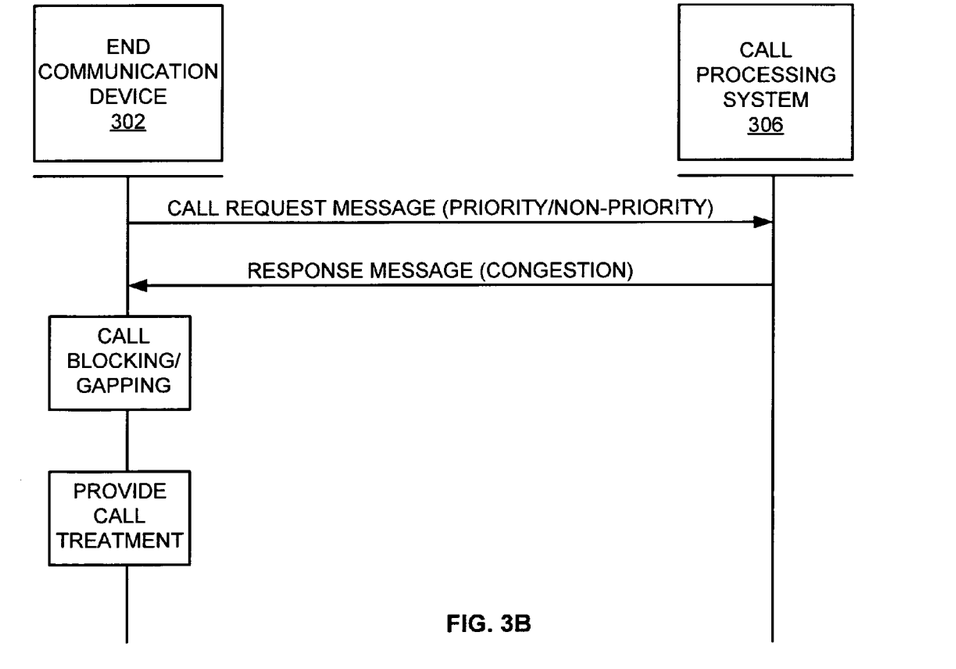
FIG. 3B is a signaling diagram illustrating call setup in the packet communication system of FIG. 3A in an example of the invention.

Packet Communication System—FIGS. 3A-3B

FIGS. 3A, 3B, 4A, 4B, 5A, 5B, and 6 and the following description depict specific examples of the invention to teach those skilled in the art how to make and use the best mode of the invention. For the purpose of teaching inventive principles, some conventional aspects of the invention have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 3A illustrates a packet communication system 300 in an example of the invention. Packet communication system 300 includes an end communication device 302, a packet network 304, and a call processing system 306. End communication device 302 and call processing system 306 are coupled to packet network 304. There may be other devices or systems in packet communication system 300 not shown for the sake of brevity.

End communication device 302 comprises any device, system, or component controlled by an end user or end entity that converts communications to the protocol being used by the packet network. Examples of end communication device 302 include a VoIP phone, a computer system operating a VoIP application, a line gateway, etc. End communication device 302 is controlled by the end user or end entity, and is not controlled by the service provider. As an example, a local switch that provides POTS service to a house is not an end communication device as defined herein as the local switch is controlled by the telephone company, not the end user.

Packet network 304 comprises any network or networks that transport packets for communication. Packet network 304 may utilize many protocols for communication, such as Internet Protocol (IP), Asynchronous Transfer Mode (ATM), frame relay, SIP, Media Gateway Control Protocol (MGCP), Signaling Gateway Control Protocol (SGCP), H.248, H.322, etc.

Call processing system 306 comprises any device, system, or component that facilitates call setup or session setup over packet network 304. Examples of call processing system 306 comprise a gateway controller, a SIP server, or a SIP proxy.

FIG. 3B is a signaling diagram illustrating call setup in packet communication system 300 in an example of the invention. To start, end communication device 302 transmits a call request message for a call. One example of a call request message is an invite message for SIP or another protocol. The call request message has a header that includes priority information for the call. The priority information may indicate that the call is an emergency call (a 911 call), a GETS call, etc.

Assume for this example that call processing system 306 is in a state of congestion. A state of congestion refers to a state where call processing system 306 is congested or is approaching congestion. Call processing system 306 receives the call request message and processes the priority information in the header of the call request message to determine if the call request message is for a high priority call. If the call request message is for a high priority call, then call processing system 306 may attempt to set up the call. If the call request message is not for a high priority call, then call processing system 306 transmits a response message indicating the state of congestion in call processing system 306. The response message may indicate the state of congestion with a congestion code in a header of the response message.

Responsive to receiving the response message, end communication device 302 performs call blocking for calls to be handled by call processing system 306. Call blocking in this sense includes call gapping, call capping, or any other scheme for rejecting or stopping a certain number of calls. End communication device 302 also provides call treatment to the end user of the calls being blocked so that the end user is aware of the status of the call. Based on this disclosure, those skilled in the art will appreciate how to modify existing packet communication systems to implement packet communication system 300 as described herein.

Packet communication system 300 advantageously handles congestion in the call processing system 306 by having end communication device 302 perform call blocking, thereby reducing the number of call request messages to the call processing system 306. Packet communication system 300 also advantageously prioritizes calls by including priority information in the header of the call request messages. Call processing system 306 can thus quickly view the priority of each message without much processing to put emergency calls, and other high priority calls, at the front of the queue.

Figure 4A:
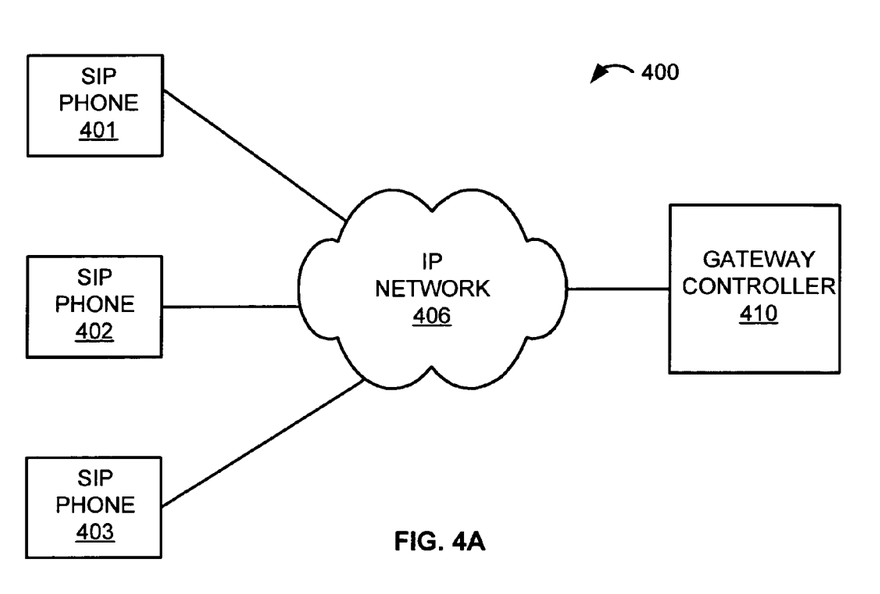
FIG. 4A illustrates another packet communication system having congestion handling in an example of the invention.
Figure 4B:
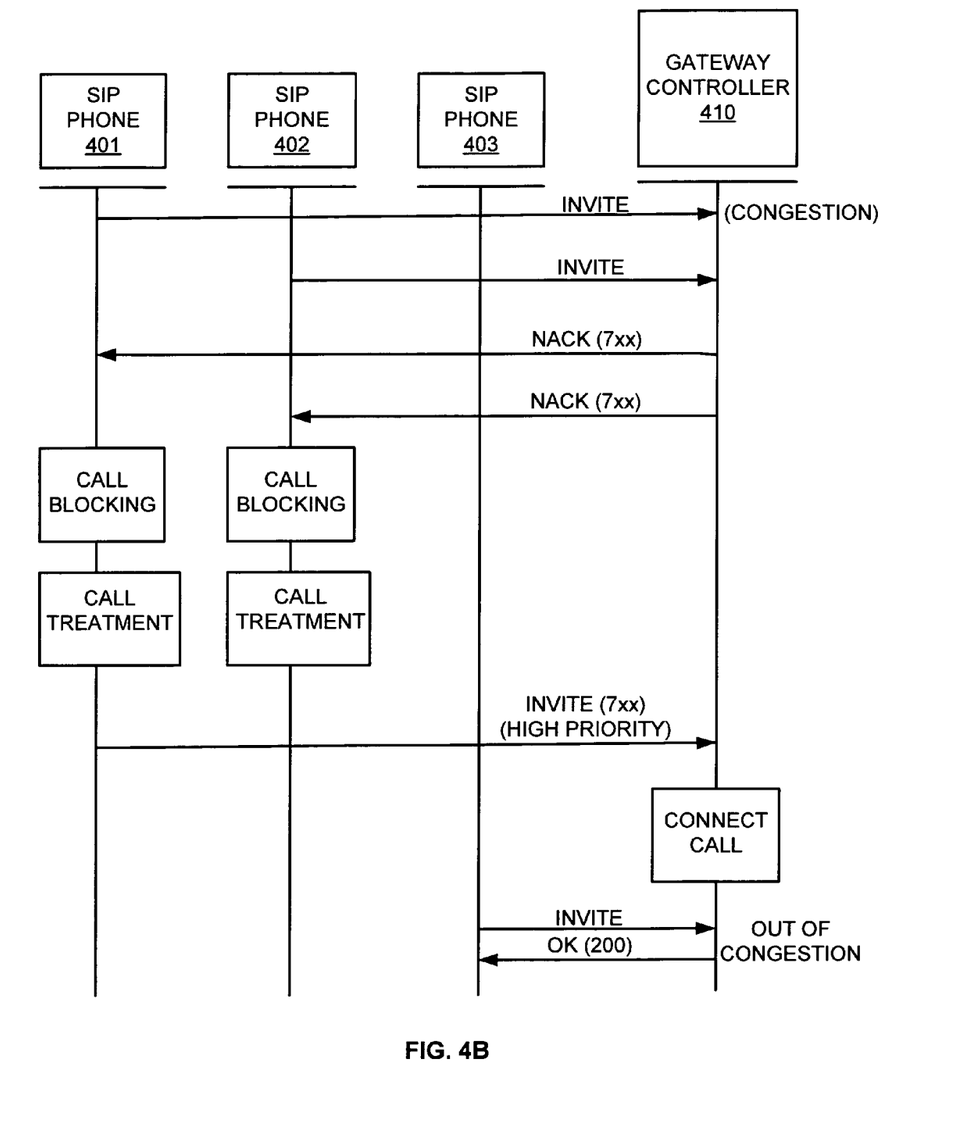
FIG. 4B is a signaling diagram illustrating call setup in the packet communication system of FIG. 4A in an example of the invention.

Another Packet Communication System having Congestion Handling—FIGS. 4A-4B

FIG. 4A illustrates a packet communication system 400 having congestion handling in an example of the invention. Packet communication system 400 includes Session Initiation Protocol (SIP) phones 401-403, an Internet Protocol (IP) network 406, and a gateway controller 410. Each of SIP phones 401-403 is connected to IP network 406. Gateway controller 410 is also connected to IP network 406. There may be many other systems or devices in packet communication system 400 that are not shown for the sake of brevity.

FIG. 4B is a signaling diagram illustrating call setup in packet communication system 400 in an example of the invention. Assume to start that SIP phones 401-402 are attempting to place calls. SIP phone 401 transmits an invite message to gateway controller 410 and SIP phone 402 transmits an invite message to gateway controller 410. In other examples, SIP phones 401-402 may transmit another type of call setup message. Concurrently, gateway controller 410 is continually performing a load control function to monitor the status of gateway controller 410. Gateway controller 410 has a particular processing threshold, such as a number of calls per second. The load control function determines whether gateway controller 410 has reached the threshold or is approaching that threshold (such as 80% of the processing threshold) and further determines if gateway controller 410 is in a state of congestion. The state of congestion may be due to processors failing in gateway controller 410, protocol stacks or queues in gateway controller 410 becoming full, or other reasons.

Responsive to a determination that gateway controller 410 is in a state of congestion, gateway controller 410 responds differently than in prior gateway controllers. Before, if the protocol stack in a prior art gateway controller was full, then the prior art gateway controller would drop the invite message. In this example, gateway controller 410 responds to the invite messages from SIP phones 401-402 with a negative acknowledgement (NACK) message. The NACK message has a header that includes a congestion code indicating the state of congestion of gateway controller 410. The congestion code may be a 7xx, which is currently an unused code in SIP.

Responsive to receiving the NACK message, each SIP phone 401-402 performs call blocking for calls to be handled by gateway controller 410. Call blocking did not previously take place in end devices, such as SIP phones. Call blocking in this sense includes call gapping, call capping, or any other scheme for rejecting or stopping a certain number of calls. For instance, call blocking may mean blocking a certain percentage of call attempts. Call blocking may also mean letting a call attempt be placed every x seconds.

Each SIP phone 401-402 may perform call blocking responsive to processing the congestion code in the NACK message. The actual congestion code may instruct the SIP phone 401-402 as to what type of call blocking to perform. For instance, one congestion code may instruct the SIP phone 401 to block 9 out of every 10 calls. Another congestion code may instruct the SIP phone 401 to block 4 out of every 5 calls.

Each SIP phone 401-402 may perform call blocking by changing to a different dial template in response to a NACK message. For instance, a SIP phone 401 may use a default dial template under normal conditions. The default dial template allows an end user to dial any number on the SIP phone 401. In response to a NACK message, SIP phone 401 may switch to a call blocking dial template. The call blocking dial template may not allow calls to be placed, except for "911", "0", or a government number. The call blocking dial template used may correspond with the congestion code (7xx) in the header of the NACK message.

Each SIP phone 401-402 also provides call treatment to the end user to inform the end user of the status of the call. The call treatment may comprise playing busy tones to the end user. The call treatment may also comprise playing a recording or message stating that the network is busy or congested.

Referring again to FIG. 4B, while gateway controller 410 is still in the state of congestion, SIP phone 401 transmits an invite message for a high priority call to gateway controller 410. The invite message has a header that includes a priority code indicating the high priority call. In the prior art, the invite messages did not include priority codes. The prior art gateway controllers had to process the invite messages and look at the dialed number to identify high priority calls. This is extremely inefficient.

The priority code in the header of the invite message may be a 7xx code. A high priority call may be an emergency call, such as a 911 call, a GETS call, a call to the operator (0), etc. Responsive to the invite message having the priority code indicating a high priority call, gateway controller 410 attempts to connect the call even though it is in a state of congestion. Advantageously, gateway controller 410 can prioritize messages based on the priority information in the header. Gateway controller 410 does not have to process each invite message down to the dialed number to identify high priority calls, but can do it based on a cursory search of the header.

Gateway controller 410 may consider other messages as high priority, in addition to the invite messages having a priority code. For instance, a release message from any of SIP phones 401-403, or any other device, will be given a high priority. Because a release message is for call tear-down, gateway controller 410 can help relieve its congestion by having calls torn down.

When SIP phone 403 attempts to place a call, SIP phone 403 transmits an invite message to gateway controller 410. As stated earlier, gateway controller 410 is continually performing a load control function to monitor the status of gateway controller 410. If the load control function determines that gateway controller 410 is again below the processing threshold, then gateway controller 410 determines that it is no longer in a state of congestion. Responsive to the determination of the normal state of gateway controller 410, gateway controller 410 transmits a message indicating that gateway controller 410 is no longer in a state of congestion. Responsive to the message indicating that gateway controller 410 is no longer in a state of congestion, SIP phones 401-402 stop performing call blocking and return to normal operation.

Figure 5A:
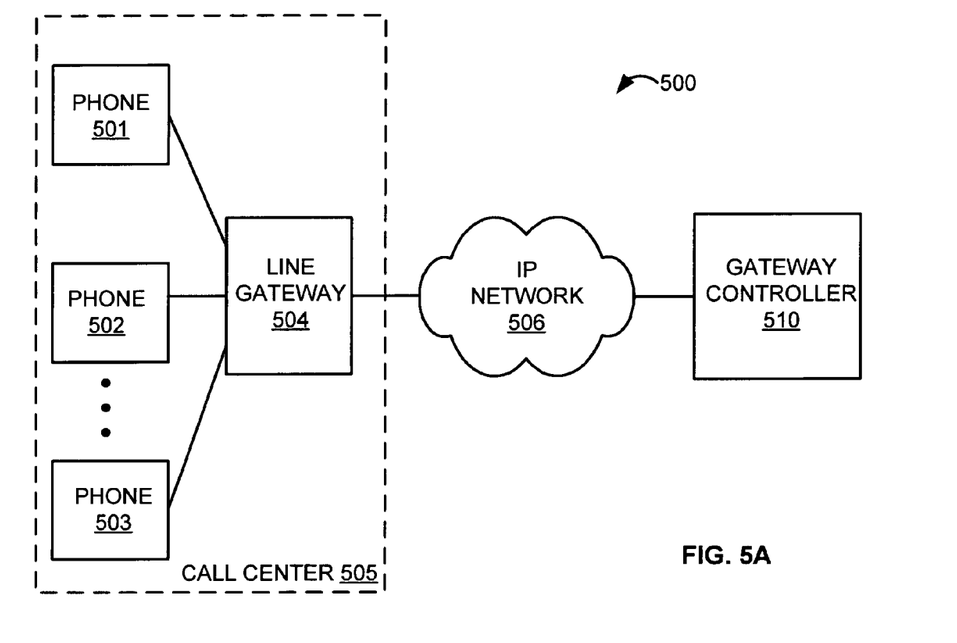
FIG. 5A illustrates another packet communication system having congestion handling in an example of the invention.
Figure 5B:
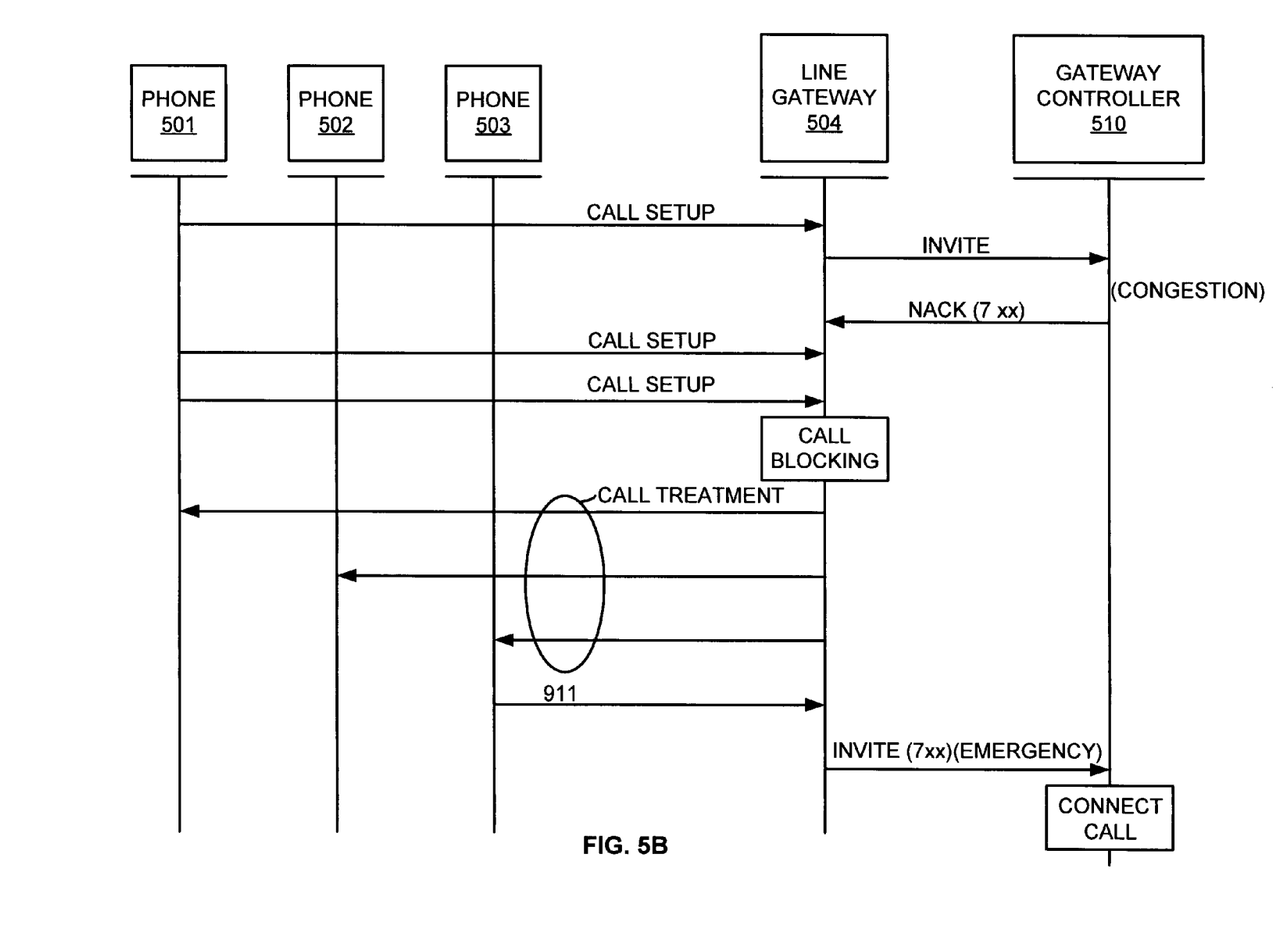
FIG. 5B is a signaling diagram illustrating call setup in the packet communication system of FIG. 5A in an example of the invention.

Another Packet Communication System having Congestion Handling—FIGS. 5A-5B

FIG. 5A illustrates a packet communication system 500 having congestion handling in an example of the invention. Packet communication system 500 includes a call center 505, an IP network 506, and a gateway controller 510. Call center 505 includes phones 501-503 coupled to a line gateway 504. Line gateway 504 is connected to IP network 506. Gateway controller 510 is also connected to IP network 506. There may be many other systems or devices in packet communication system 500 that are not shown for the sake of brevity.

FIG. 5B is a signaling diagram illustrating call setup in packet communication system 500 in an example of the invention. Assume to start that phone 501 is attempting to place a call. Phone 501 transmits call setup information to line gateway 504. The call setup information may comprise a dialed number. Responsive to the call setup information, line gateway 504 generates an invite message and transmits the invite message to gateway controller 510. Line gateway 504 may transmit another type of call setup message in other examples.

Concurrently, gateway controller 510 determines whether it is in a state of congestion, as previously described. Responsive to a determination that gateway controller 510 is in a state of congestion, gateway controller 510 responds differently than in prior art gateway controllers. Before, if the protocol stack, in a prior art gateway controller, was full, then the gateway controller would drop the invite message. In this example, gateway controller 510 responds to the invite message from line gateway 504 with a negative acknowledgement (NACK) message. The NACK message may have a header that includes a congestion code indicating the state of congestion of gateway controller 510. The congestion code may be a 7xx, which is currently an unused code in SIP.

Responsive to receiving the NACK message, line gateway 504 performs call blocking for calls to be handled by gateway controller 510. Call blocking did not previously take place in end devices, such as line gateway 504. As shown in FIG. 5B, subsequent to receiving the NACK message, line gateway 504 receives call setup information from phones 502-503. Line gateway 504 performs call blocking on the call attempts from phones 502-503, and the previous call attempt from phone 501. Call blocking in this sense includes call gapping, call capping, or any other scheme for rejecting or stopping a certain number of calls.

Line gateway 504 also provides call treatment to phones 501-503 to inform the end user of phones 501-503 of the status of the calls. The call treatment may comprise playing busy tones to the end user. The call treatment may also comprise playing a recording or message stating that the network is busy or congested.

Then, while gateway controller 510 is still in the state of congestion, phone 503 attempts to place a 911 call. Responsive to the 911 call, line gateway 504 generates an invite message for a high priority call. The invite message has a header that includes a priority code indicating the high priority call. The priority code may also be a 7xx code. In the prior art, the invite messages did not include priority codes. The gateway controllers, in the prior art, had to process the invite messages and look at the dialed number to identify high priority calls, which is inefficient.

Line gateway 504 then transmits the invite message to gateway controller 510. Responsive to the invite message having the priority code indicating a high priority call, gateway controller 510 attempts to connect the call even though it is in a state of congestion. Advantageously, gateway controller 510 can prioritize messages to process based on the priority information in the header. Gateway controller 510 does not have to process each invite message down to the dialed number to identify high priority calls, but can do it based on a cursory search of the header.

Figure 6:
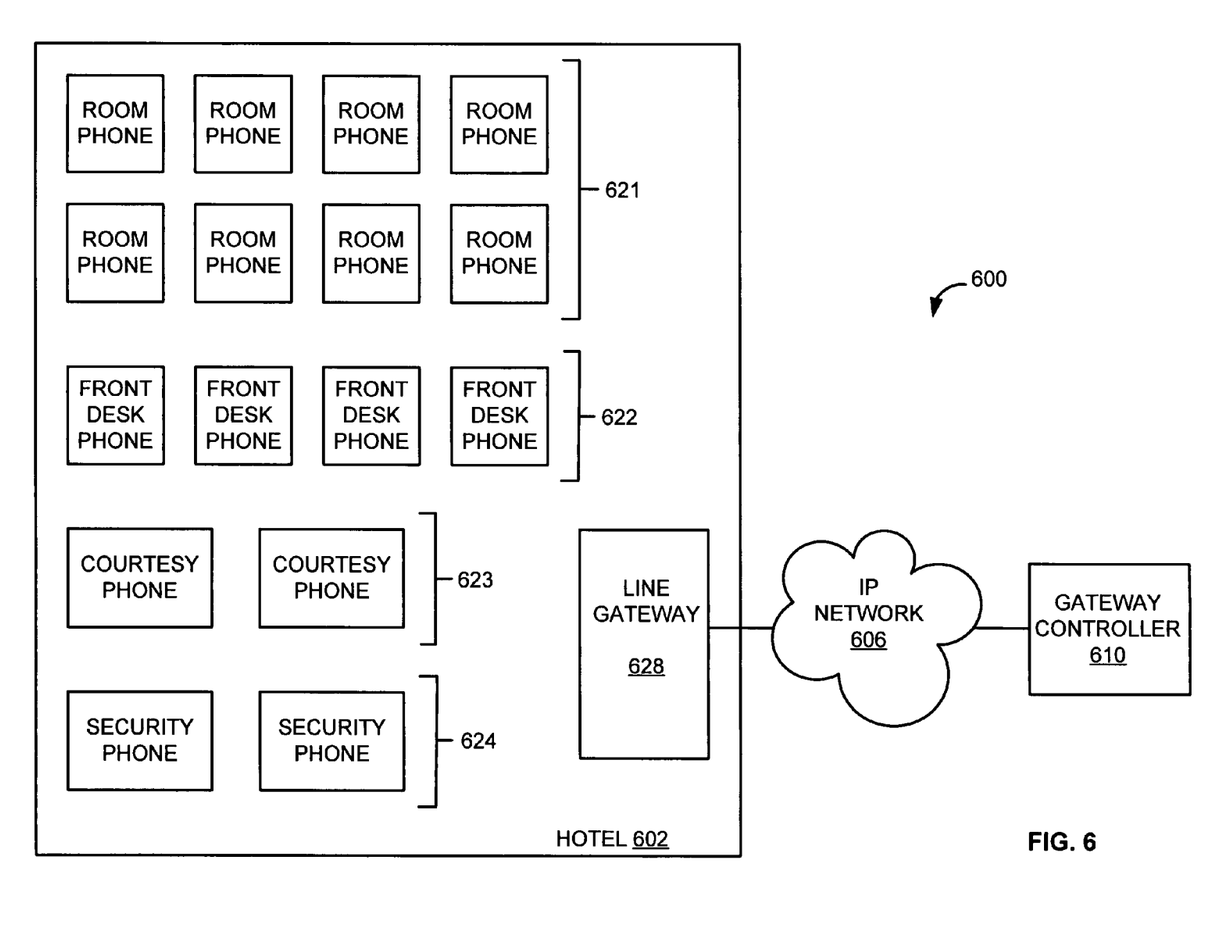
FIG. 6 illustrates a packet communication system having selective call blocking in an example of the invention.

Packet Communication System having Selective Call Blocking—FIG. 6

FIG. 6 illustrates a packet communication system 600 having selective call blocking in an example of the invention. Packet communication system 600 includes a hotel 602, an IP network 606, and a gateway controller 610. Hotel 602 includes room phones 621, front desk phones 622, courtesy phones 623, security phones 624, and a line gateway 628. Each of the phones 621-624 are coupled to line gateway 628. There may be many other phones in hotel 602 not shown in FIG. 6. Line gateway 628 is connected to IP network 606. Gateway controller 610 is also connected to IP network 606. There may be many other systems or devices in packet communication system 600 that are not shown for the sake of brevity.

Line gateway 628 allows for selective call blocking. The selective call blocking may be on a per-phone basis. Assume that a guest in hotel 602 attempts to place a call using one of the room phones 621. The guest dials a number on phone 621 and phone 621 transmits call setup information to line gateway 628. The call setup information comprises the dialed number. Responsive to the call setup information, line gateway 628 generates an invite message and transmits the invite message to gateway controller 610 over IP network 606.

Gateway controller 610 continually determines whether it is in a state of congestion, as previously described. Responsive to the determination that gateway controller 610 is in a state of congestion, gateway controller 610 responds to the invite message from line gateway 628 with a negative acknowledgement (NACK) message. The NACK message may have a header that includes a congestion code indicating the state of congestion of gateway controller 610.

Responsive to receiving the NACK message, line gateway 628 performs selective call blocking for calls to be handled by gateway controller 610. For instance, line gateway 628 may assign priority to phones in hotel 602. Line gateway 628 may allow 1 in every 100 calls from the room phones 621, may allow 1 in every 10 calls from the front desk phones 622, may allow no calls from the courtesy phones 623, and may allow every call from the emergency phones 624. Line gateway 628 also provides call treatment to phones 621-623 having calls being blocked to inform the end user of phones 621-623 of the status of the calls. The call treatment may comprise playing busy tones to the end user. The call treatment may also comprise playing a recording or message stating that the network is busy or congested.

If line gateway 628 receives a high priority call from one of phones 621-624 during this period of selective call blocking, then line gateway 628 attempts to connect the call even though gateway controller 610 is in a congestion state. For instance, even though 1 in every 100 calls from the room phones 621 is connected, line gateway 628 will attempt to connect a 911 call from any one of the room phones 621.

Line gateway 628 may also perform selective call blocking on a per-user basis. Users may be identified by an identification number. Security guards in hotel 602 may be assigned a particular ID number and line gateway 628 does not block any calls made by the security guards. Other employees in hotel 602 may be assigned another ID number and line gateway 628 blocks 1 of every 10 calls made by the employees. Guests in hotel 602 may be assigned another ID number and line gateway 628 blocks 1 of every 100 calls made by the guests.

By performing selective call blocking, line gateway 628 is able to prioritize calls going to gateway controller 610. When gateway controller 610 is in a state of congestion, line gateway 628 filters calls at the end user side of the network thereby reducing the processing load on the gateway controller 610.

What is claimed is:

1. A packet communication system, comprising:
  a packet network;
  an end communication device coupled to the packet network and configured to receive a call request message for a call, and transmit the call request message over the packet network, the call request message having a header that includes priority information for the call; and
  a call processing system coupled to the packet network and configured to receive the call request message, process the priority information in the header of the call request message to determine if the call request message is for a high priority call, and transmit a response message over the packet network indicating a state of congestion in the call processing system responsive to a determination that the call request message is not for a high priority call;
  the end communication device is configured to receive the response message and perform call blocking on call requests received by the end communication device to be handled by the call processing system responsive to the response message;
  wherein the call processing system is further configured to transmit a message indicating that the call processing system is no longer in the state of congestion; and
  wherein the end communication device is further configured to stop performing call blocking responsive to the message indicating that the call processing system is no longer in the state of congestion.

2. The packet communication system of claim 1 wherein the end communication device is configured to provide call treatment for calls being blocked.

3. The packet communication system of claim 1 wherein the response message has a header that includes a congestion code indicating the state of congestion in the call processing system.

4. The packet communication system of claim 3 wherein the end communication device is configured to perform the call blocking responsive to processing the congestion code.

5. The packet communication system of claim 1 wherein the end communication device is configured to perform selective call blocking.

6. The packet communication system of claim 1 wherein the call processing system comprises a gateway controller.

7. The packet communication system of claim 1 wherein the call processing system is configured to determine whether the call processing system is in the state of congestion.

8. The packet communication system of claim 1 wherein a protocol used in the packet network comprises Session Initiation Protocol (SIP).

9. The packet communication system of claim 8 wherein the call request message comprises an invite message.

10. The packet communication system of claim 1 wherein the end communication device comprises a Voice over Internet Protocol (VoIP) phone.

11. The packet communication system of claim 1 wherein the end communication device comprises a computer system operating a Voice over Internet Protocol (VoIP) application.

12. The packet communication system of claim 1 wherein the end communication device comprises a line gateway.

13. The packet communication system of claim 1 wherein the priority information in the header of the call request message comprises a priority code indicating if the call is a high priority call.

14. A method of providing congestion handling in a packet communication network, wherein the packet communication network comprises an end communication device, a packet network, and a call processing system, the method comprising:
  in the end communication device, receiving a call request message for a call, and transmitting the call request message over the packet network, the call request message having a header that includes priority information for the call;
  in the call processing system, receiving the call request message, processing the priority information in the header of the call request message to determine if the call request message is for a high priority call, and transmitting a response message over the packet network indicating a state of congestion in the call processing system responsive to a determination that the call request message is not for a high priority call;
  in the end communication device, receiving the response message, and performing call blocking on call requests received by the end communication device to be handled by the call processing system responsive to the response message;
  in the call processing system, transmitting a message indicating that the call processing system is no longer in the state of congestion; and
  in the end communication device, stopping call blocking responsive to the message indicating that the call processing system is no longer in the state of congestion.

15. The method of claim 14 further comprising:
  in the end communication device, providing call treatment for calls being blocked.

16. The method of claim 14 wherein the response message has a header that includes a congestion code indicating the state of congestion in the call processing system.

17. The method of claim 16 wherein performing call blocking on calls to be handled by the call processing system comprises:
performing the call blocking responsive to processing the congestion code.

18. The method of claim 14 further comprising:
in the end communication device, performing selective call blocking.

19. The method of claim 14 wherein the call processing system comprises a gateway controller.

20. The method of claim 14 further comprising:
determining whether the call processing system is in the state of congestion.

21. The method of claim 14 wherein a protocol used in the packet network comprises Session Initiation Protocol (SIP).

22. The method of claim 21 wherein the call request message comprises an invite message.

23. The method of claim 14 wherein the end communication device comprises a Voice over Internet Protocol (VoIP) phone.

24. The method of claim 14 wherein the end communication device comprises a computer system operating a Voice over Internet Protocol (VoIP) application.

25. The method of claim 14 wherein the end communication device comprises a line gateway.

26. The method of claim 14 wherein the priority information in the header of the call request message comprises a priority code indicating if the call is a high priority call.

* * * * *